United States Patent [19]

Irie et al.

[11] Patent Number: 5,555,320
[45] Date of Patent: Sep. 10, 1996

[54] PATTERN RECOGNITION SYSTEM WITH IMPROVED RECOGNITION RATE USING NONLINEAR TRANSFORMATION

[75] Inventors: Bunpei Irie; Yoshiaki Kurosawa, Kanagawa-ken, both of Japan

[73] Assignee: Kabushiki Kaisha Toshiba, Kawasaki, Japan

[21] Appl. No.: 158,857

[22] Filed: Nov. 29, 1993

[30] Foreign Application Priority Data

Nov. 27, 1992 [JP] Japan .................................. 4-318698

[51] Int. Cl.$^6$ .................................................. G06K 9/62
[52] U.S. Cl. .................... 382/225; 382/276; 382/190; 382/157; 395/2.54; 395/2.41
[58] Field of Search ................... 382/14, 15, 16, 382/3, 41, 155, 156, 157, 159, 119, 276, 286, 225; 381/42, 43; 395/2.4, 2.41, 2.47, 2.52, 2.54

[56] References Cited

U.S. PATENT DOCUMENTS

| | | | |
|---|---|---|---|
| 4,958,375 | 9/1990 | Reilly et al. | 382/14 |
| 4,965,842 | 10/1990 | Crossley et al. | 382/286 |
| 5,054,093 | 10/1991 | Cooper et al. | 382/14 |
| 5,105,468 | 4/1992 | Guyon et al. | 382/158 |
| 5,259,038 | 11/1993 | Sakou et al. | 382/14 |
| 5,259,039 | 11/1993 | Akamatsu | 382/14 |
| 5,293,456 | 3/1994 | Guez et al. | 382/159 |

OTHER PUBLICATIONS

J. H. Friedman et al. "Projection Pursuit Regression" Journal of the American Statistical Association, vol. 76:817–823, (1981).

Primary Examiner—Leo Boudreau
Assistant Examiner—David R. Anderson
Attorney, Agent, or Firm—Foley & Lardner

[57] ABSTRACT

A pattern recognition system capable of handling the non-Gaussian feature vector distribution in the feature vector space such that the recognition rate can be improved while using the pattern matching based on the assumption of the Gaussian feature vector distribution. In the system, a nonlinear transformation for each recognizable category is applied to the feature vector extracted from the input pattern to be recognized, to obtain a transformed feature data for the input pattern, where the nonlinear transformation maps linearly inseparable distributions in a vector space containing the feature vector onto linearly separable distributions. Then, the transformed feature data for the input pattern is compared with reference feature model for each recognizable category indicating a feature vector distribution for each category, to find a category of the input pattern as that of the reference feature model closest to the transformed feature data for the input pattern.

22 Claims, 7 Drawing Sheets

PATTERN RECOGNITION SYSTEM WITH IMPROVED RECOGNITION RATE USING NONLINEAR TRANSFORMATION

BACKGROUND OF THE INVENTION

1. Field of the Invention

The present invention relates to a pattern recognition system for recognizing various recognition targets such as speech data, character data, image data, etc.

2. Description of the Background Art

In the field of the pattern recognition aiming at the recognition of various recognition targets such as speech data, character data, image data, etc., the most typical conventionally known scheme has been a pattern matching scheme in which a feature vector is generated from an input pattern, and some kind of discrimination of the generated feature vector is attempted in a vector space containing the generated feature vectors, assuming that the distribution of the feature vectors in such a vector space is the Gaussian distribution.

However, in general, the distribution of the feature vectors in the vector space is not necessarily limited to the Gaussian distribution in practice, and it is actually much more frequent to encounter the non-Gaussian feature vector distributions. In such cases of the non-Gaussian feature vector distribution, it has been difficult to improve the recognition rate by the conventional pattern matching scheme based on the assumption of the Gaussian feature vector distribution.

On the other hand, there are many recent propositions for the other recognition schemes such as the neural network scheme and various nonlinear recognition schemes. However, none of these recent propositions has been really capable of resolving the above noted problem as none of these recent propositions introduces an accurate model for the actual feature vector distribution.

For example, in the neural network scheme, it has been claimed that the recognition system appropriate for the actual distribution is going to be constructed automatically, but in reality, it has been impossible to know what kind of model is used at what level of approximation with respect to the actual distribution, and it has also been impossible to take care of this situation at the system designing stage.

For instance, in a case of having a feature vector distribution in which two distribution blocks for two different categories are arranged in such a complicated manner that they have the almost identical center of gravity, it is impossible to separate these two distributions blocks linearly, i.e., by a straight line.

In addition, since such a feature vector distribution is apparently not Gaussian, it is difficult to recognize the patterns belonging to these categories by using any scheme based on the assumption of the Gaussian feature vector distribution. On the other hand, when the neural network scheme is used in this case, it cannot be ascertained exactly what is going to be recognized and how, so that there has been no guarantee for the neural network to be able to make an accurate recognition. In practice, the neural network may be able to distinguish a relatively simple distribution, but there is no guarantee that the same is true for much more complicated distributions.

Moreover, in the conventional pattern recognition scheme, the actual feature vector distribution has rarely been taken into consideration at the dictionary preparation stage or the dictionary modification stage, and some ideal Gaussian distribution has been assumed unwarrantedly, so that an effective and efficient dictionary preparation and modification has not been realized.

SUMMARY OF THE INVENTION

It is therefore an object of the present invention to provide a pattern recognition system capable of handling the non-Gaussian feature vector distribution in the feature vector space in such a manner that the improvement of the recognition rate can be achieved while using the pattern matching based on the assumption of the Gaussian feature vector distribution.

According to one aspect of the present invention, there is provided a pattern recognition system, comprising: pattern input means for inputting an input pattern to be recognized; feature extraction means for extracting a feature vector from the input pattern inputted by the pattern input means; nonlinear transformation means for applying a nonlinear transformation for each recognizable category to the feature vector extracted by the feature extraction means to obtain a transformed feature data for the input pattern, where the nonlinear transformation maps linearly inseparable distributions in a vector space containing the feature vector onto separable distributions; and matching means for comparing the transformed feature data for the input pattern with a reference feature model for each recognizable category indicating a feature vector distribution for each category, to find a category of the input pattern as that of the reference feature model closest to the transformed feature data for the input pattern.

According to another aspect of the present invention there is provided a method of pattern recognition, comprising the steps of: (a) inputting an input pattern to be recognized; (b) extracting a feature vector from the input pattern inputted at the step (a); (c) applying a nonlinear transformation for each recognizable category to the feature vector extracted at the step (b) to obtain a transformed feature data for the input pattern, where the nonlinear transformation maps linearly inseparable distributions in a vector space containing the feature vector onto separable distributions; and (d) comparing the transformed feature data for the input pattern with a reference feature model for each recognizable category indicating a feature vector distribution for each category, to find a category of the input pattern as that of the reference feature model closest to the transformed feature data for the input pattern.

Other features and advantages of the present invention will become apparent from the following description taken in conjunction with the accompanying drawings.

DETAILED DESCRIPTION OF THE PREFERRED EMBODIMENTS

Figure 1:
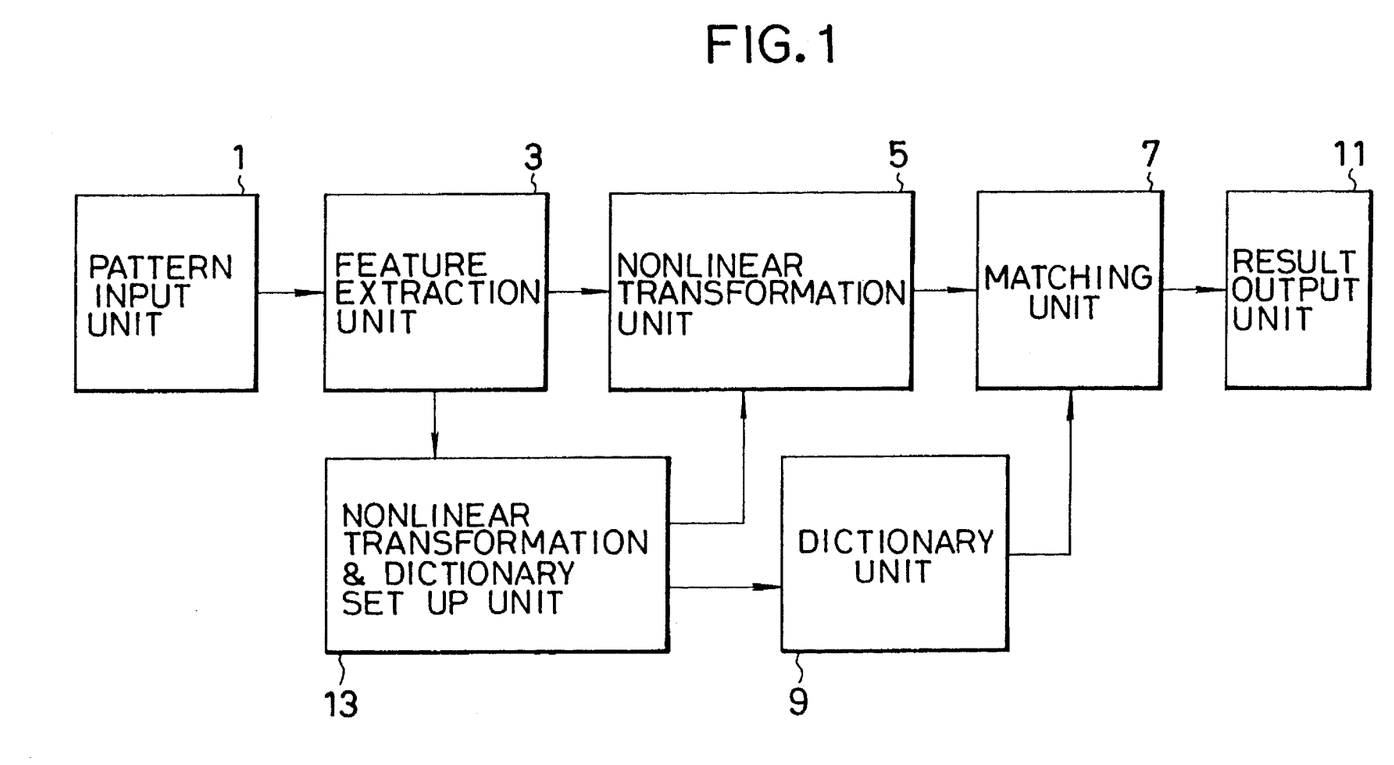
FIG. 1 is a schematic block diagram of one embodiment of a pattern recognition system according to the present invention.

Referring now to FIG. 1, one embodiment of the pattern recognition system according to the present invention will be described in detail.

In this embodiment, the system comprises: a pattern input unit 1 for inputting an input pattern such as image data of an unknown category to be recognized by the system; a feature extraction unit 3 for extracting a feature vector from the input pattern inputted by the pattern input unit 1; a nonlinear transformation unit 5 for applying an appropriate nonlinear transformation for each category to the feature vector obtained by the feature extraction unit 3, to obtain a transformed feature data for the input pattern; a dictionary unit 9 for storing a reference feature model for each category; a matching unit 7 for comparing the transformed feature data for the input pattern obtained by the nonlinear transformation unit 5 with the reference feature model for each category stored in the dictionary unit 9 by calculating the similarities; a result output unit 11 for outputting a recognition result concerning the category to which the input pattern belongs, according to the similarities calculated by the matching unit 7; and a nonlinear transformation and dictionary set up unit 13 for determining the appropriate nonlinear transformation for each category used by the nonlinear transformation unit 5 and the reference feature model for each category stored in the dictionary unit 9.

In this configuration of FIG. 1, at the pattern input unit 1, the input pattern such as the speech data, character data, image data, etc., entered into the system is converted into the electric signals representing the input pattern data, and the obtained input pattern data are supplied to the feature extraction unit 3.

The feature extraction unit 3 then extracts the feature vector from the supplied input pattern data by applying suitable processing on the input pattern data, such as a blurring illustrated below, in the known manner. In general, the feature vector so obtained corresponds to one point in an N-dimensional vector space, where N is an integer.

Here, in a case of the preliminary learning operation to determine the nonlinear transformation to be used at the nonlinear transformation unit 5 and the reference feature models to be stored in the dictionary unit 9, a plurality of learning patterns of known categories are entered at the pattern input unit 1, and the feature extraction unit 3 obtains the feature vectors for these learning patterns and then supplies the obtained feature vectors to the nonlinear transformation and dictionary set up unit 13. On the other hand, in the pattern recognition operation to recognize the input pattern of an unknown category inputted at the input unit 1, the feature extraction unit 3 supplies the obtained feature vector for the input pattern to be recognized to the nonlinear transformation unit 5.

In the preliminary learning operation, the nonlinear transformation and dictionary set up unit 13 obtains the distribution of the feature vectors for a plurality of learning patterns for a certain category in the N-dimensional vector space from the feature extraction unit 3. This feature vector distribution can then be represented by a manifold which optimally approximates this feature vector distribution in a sense of the least square error criteria. The manifold generally has a form of one quadratic curve or two dimensional quadratic surface. Then, the nonlinear transformation and dictionary set up unit 13 determines the linear transformation which maps each point on the manifold onto a linear space as the nonlinear transformation suitable for each category. The data resulting from this nonlinear transformation has a feature vector distribution resembling the Gaussian distribution, and will be referred to as the transformed feature data.

In this manner, the nonlinear transformation and dictionary set up unit 13 determines the nonlinear transformation appropriate for each category, and specifies the determined nonlinear transformation for each category to the nonlinear transformation unit 3, before the pattern recognition operation.

It is to be noted here that, instead of determining the nonlinear transformation for each category separately as described above, the nonlinear transformation may be determined for a group of categories, or a single nonlinear transformation may be used for all the categories, if possible and desired.

It is also to be noted here that the nonlinear transformation for mapping the manifold onto the linear space is not necessarily unique.

In addition, in the preliminary learning operation, the nonlinear transformation and dictionary set up unit 13 also determines the reference feature model for each category obtained by applying the determined nonlinear transformation to the feature vector distribution of the learning patterns for each category to be modelled, and registers the obtained reference feature model for each category in the dictionary unit 9, before the pattern recognition operation. Here, the reference feature models may be obtained independently from the learning patterns used in determining the nonlinear transformation, if desired.

On the other hand, in the pattern recognition operation, the nonlinear transformation unit 5 applies the appropriate nonlinear transformation for each category determined by the nonlinear transformation and dictionary set up unit 13 in the preliminary learning operation and specified to the nonlinear transformation unit 5 in advance, to the feature vector supplied from the feature extraction unit 3, so as to obtain the transformed feature data for the input pattern to be recognized.

It is to be noted here that the feature extraction unit 3 and the nonlinear transformation unit 5 may be constructed integrally, if desired.

The transformed feature data for the input pattern outputted from the nonlinear transformation unit 5 is then entered into the matching unit 7, at which the transformed feature data for the input pattern is compared with the reference feature model for each category stored in the dictionary unit 9, in order to find the reference feature model closest to the transformed feature data for the input pattern. Here, the comparison can be made by any known matching scheme, such as the multiple similarity method, the subspace method, or the matching using the Euclidean distances, the city block distances, or the Mahalanobis distances. In this embodiment, the matching unit 7 makes the matching by calculating the multiple similarity of the linear feature vector and the reference linear feature vector for each category.

Then, the result output unit 11 outputs the category of the closest reference feature model obtained by the matching unit 7 as the recognition result for the category to which the input pattern belongs, in an appropriate format. Here, depending on the matching result, the result output unit 11 may output no answer (or an indication of the rejection) in a case where the similarity of the closest reference feature model is not sufficiently high, or a plurality of answers in a case where there are more than one reference feature models with sufficiently high similarities. In the latter case, each answer may be accompanied by the calculated similarity or the reliability.

Figure 2:
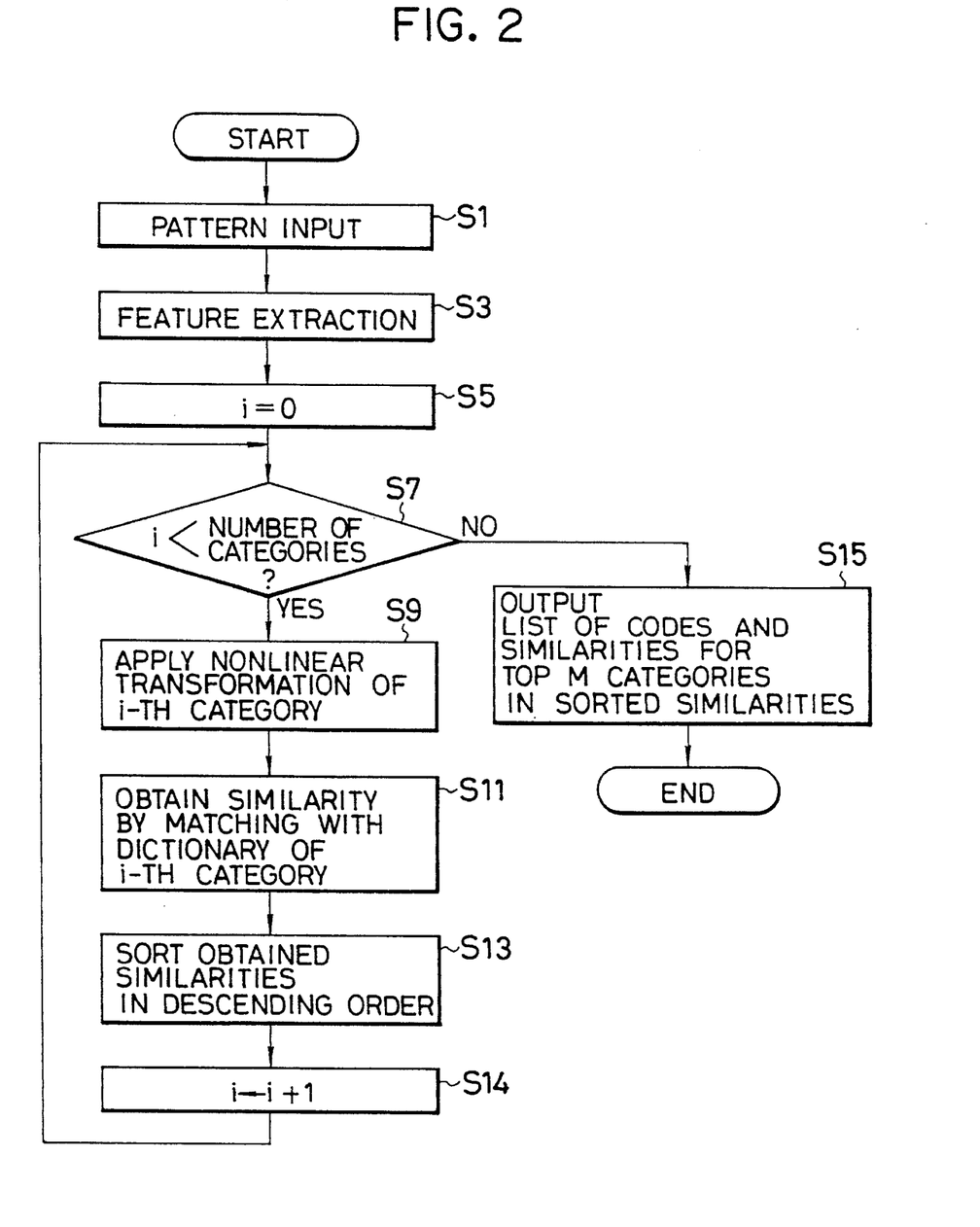
FIG. 2 is a flow chart for the pattern recognition operation of the pattern recognition system of FIG. 1.

Thus, in this embodiment, the pattern recognition operation is carried out according to the flow chart of FIG. 2, as follows.

First, at the step S1, the input pattern such as the speech data, character data, image data, etc., is entered through the pattern input unit 1 and converted into the electric signals representing the input pattern data.

Next, at the step S3, the feature vector for the input pattern is extracted by the feature extraction unit 3 by applying suitable processing, such as the blurring, on the input pattern data supplied from the pattern input unit 1.

Then, by the following steps S5 to S14, the nonlinear transformation unit 5 applies the appropriate nonlinear transformation for each category to the feature vector supplied from the feature extraction unit 3, so as to obtain the transformed feature data for the input pattern, and the matching unit 7 makes the matching between the transformed feature data for the input pattern with the reference feature model for each category stored in the dictionary unit 9, by calculating the similarity of the linear feature vector and the reference linear feature vector for each category.

Namely, an index "i" labelling the categories is initially set to 0 at the step S5, and as long as this index "i" is found to be less than the total number of the categories registered in the dictionary unit 9 at the step S7, the predetermined nonlinear transformation for the i-th category is applied to the supplied feature vector by the nonlinear transformation unit 5 at the step S9, the similarity of the obtained linear feature vector and the reference linear feature vector for the i-th category is calculated by the matching unit 7 at the step S11, the similarities calculated so far are sorted in a descending order of the similarity value at the step S13, and the index "i" is incremented by one at the step S14 from which the operation returns to the step S7 described above such that the steps S7 to S14 are repeated for all the categories registered in the dictionary unit 9.

When the index "i" is found to be greater than the total number of the categories registered in the dictionary unit 9 at the step S7, the operation proceeds to the step S15 at which the result output unit 11 outputs the recognition result in a form of a list of codes representing the categories of the reference feature models with top M (M is any desirable integer) similarities in the descending order obtained by the sorting at the step S13, along with their calculated similarities.

Referring now to FIG. 3 to FIG. 7, the pattern recognition operation in this embodiment will be described more specifically by using a concrete example.

Figure 3:
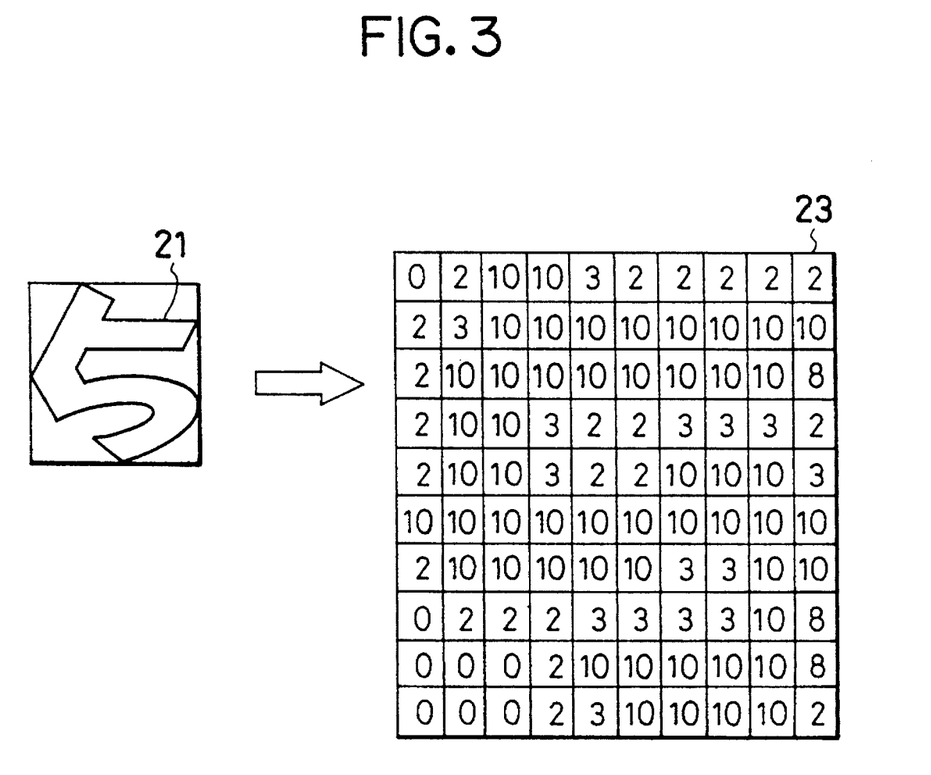
FIG. 3 is a diagrammatic illustration of an example of a blurring used in the pattern recognition system of FIG. 1.

FIG. 3 shows an exemplary input pattern in a form of a character pattern 21 (character "5"). When this character pattern 21 is entered as the input pattern to be recognized through the pattern input unit 1, the feature extraction unit 3 applies the blurring to obtain a transformed pattern 23 as shown in FIG. 3. This blurring can be achieved by applying a k×k Gaussian function filter, where k is an integer, at appropriate intervals, such as k/2, onto the input pattern. In this example of FIG. 3, the transformed pattern 23 is given in a form of 10×10 picture element array, where a numeral assigned to each picture element indicates the gradation level of the corresponding portion in the character pattern 21. This transformed pattern 23 then defines a 100-dimensional feature vector given by the gradation levels of each of the 10×10 picture elements.

Figure 4:
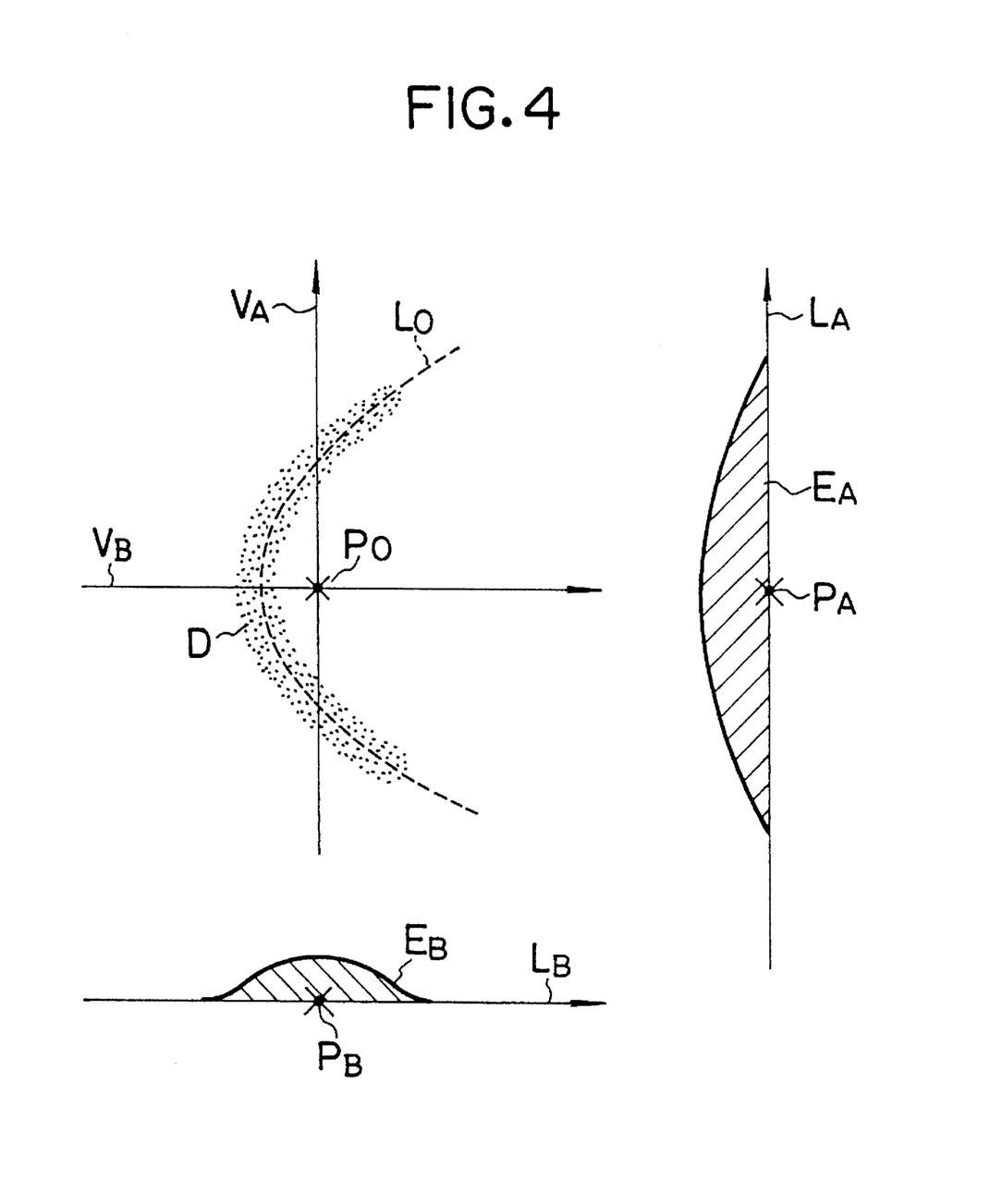
FIG. 4 is a graph showing an exemplary feature vector distribution obtained in the pattern recognition system of FIG. 1.

Here, for the sake of simplicity, it is assumed that the 100-dimensional feature vector space containing this 100-dimensional feature vector can be represented by its 2 2-dimensional subspace as depicted in FIG. 4. In FIG. 4, a distribution D represents the feature vector distribution for a plurality of learning patterns for a certain category obtained by the preliminary learning operation, in which each point corresponds to a feature vector for each learning pattern and $V_A$ and $V_B$ indicate two principal component vectors of this distribution D. In this case of FIG. 4, the feature vector distribution D is a crescent shaped distribution which is non-Gaussian.

Now, when this distribution D is projected onto two axes $L_A$ and $L_B$ in the directions of its two principal components, the projected 1-dimensional distributions appear as indicated by $E_A$ and $E_B$, each of which has an appearance resembling the Gaussian distribution in which the actual non-Gaussian nature of the distribution D is lost. The conventional pattern recognition scheme based on the assumption of the Gaussian feature vector distribution has been applicable only to such an overly simplified situation in which the actual non-Gaussian nature is hidden, so that the improvement of the recognition rate has been impossible.

For example, suppose there is a feature vector for a pattern of another category different from that of the distribution D, in a vicinity of the intersection point $P_0$ of the two principal vectors $V_A$ and $V_B$ of the distribution D, as shown in FIG. 4. In such a case, this point $P_0$ is projected onto the positions $P_A$ and $P_B$ within the projected 1-dimensional distributions $E_A$ and $E_B$, respectively, as indicated in FIG. 4, so that as long as one is looking at the projected 1-dimensional distribution $E_A$ or $E_B$, there is no way of distinguishing the positions $P_A$ or $P_B$ from the rest of the projected 1-dimensional distribution $E_A$ or $E_B$ and thereby recognizing that the point $P_0$ actually belongs to another category different from that of the distribution D.

Figure 5:
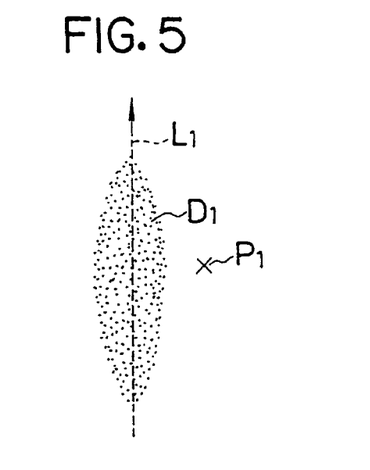
FIG. 5 is a graph showing a nonlinearly transformed feature vector distribution obtained from the exemplary feature vector distribution of FIG. 4 in the pattern recognition system of FIG. 1.

For this reason, in this embodiment, an approximation curve $L_0$ for the crescent shaped distribution D as shown in FIG. 4 is introduced, and this crescent shaped distribution D is transformed into a transformed distribution $D_1$ as shown in FIG. 5 that can be approximated by a straight line $L_1$, by the nonlinear transformation which maps the curve $L_0$ onto the straight line $L_1$. Here, each point in the distribution D is mapped onto the transformed distribution $D_1$ such that a perpendicular distance from each point to the curve $L_0$ in the distribution D is preserved as a perpendicular distance from a mapped point to the straight line $L_1$ in the transformed distribution $D_1$. As a result of this nonlinear transformation, the point $P_0$ in FIG. 4 is mapped onto a point $P_1$ in FIG. 5, which can be distinguished from the transformed distribution $D_1$ linearly, i.e., even by the pattern matching based on the assumption of the Gaussian feature vector distribution.

Figure 6A:
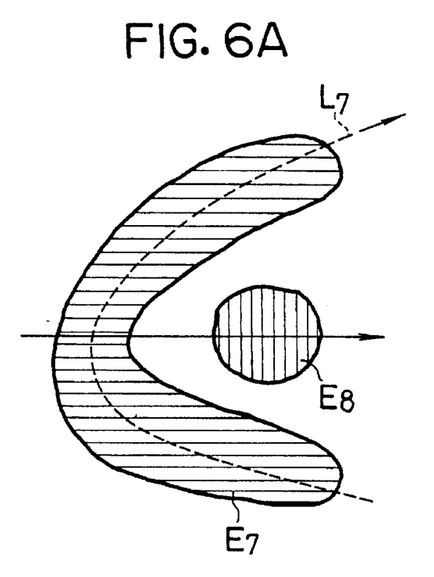
FIGS. 6A and 6B are diagrammatic illustrations of an exemplary feature vector distribution before and after the nonlinear transformation in the pattern recognition system of FIG. 1.

In other words, as shown in FIG. 6A, when two feature vector distributions $E_7$ and $E_8$ for different categories are distributed in such a complicated manner that they have the almost identical center of gravity, it is impossible to separate these two distributions $E_7$ and $E_8$ by a straight line, i.e., they are linearly inseparable. Thus, in such a case, the categories represented by these distributions $E_7$ and $E_8$ could not have been recognized accurately by the pattern matching based on the assumption of the Gaussian feature vector distribution.

Figure 6B:
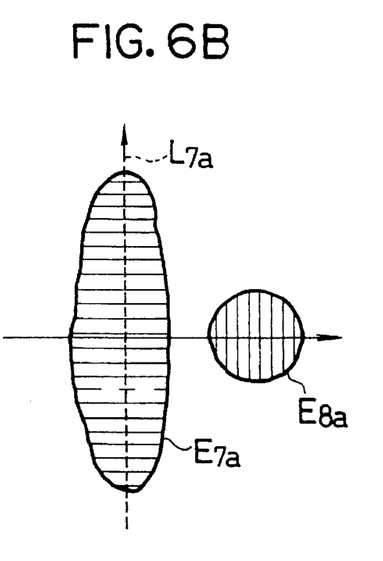

In contrast, when the nonlinear transformation for mapping the curve $L_7$ approximating the distribution $E_7$ onto a straight line $L_{7a}$ approximating a transformed distribution $E_{7a}$ as shown in FIG. 6B is applied according to the present invention, the transformed distributions $E_{7a}$ and $E_{8a}$ become linearly separable, so that the categories represented by these transformed distributions $E_{7a}$ and $E_{8a}$ become accurately recognizable even in the pattern matching based on the assumption of the Gaussian feature vector distribution.

In this manner, according to the present invention, it becomes possible to provide a pattern recognition system capable of handling the non-Gaussian feature vector distribution in the feature vector space in such a manner that the improvement of the recognition rate can be achieved while using the pattern matching based on the assumption of the Gaussian feature vector distribution, by utilizing the nonlinear transformation for transforming a linearly inseparable non-Gaussian feature vector distribution into a linearly separable Gaussian-like transformed distribution and carrying out the pattern matching for such a transformed distribution.

Here, the approximation curve such as the curve $L_0$ for the distribution D in FIG. 4 described above can be obtained as follows.

Figure 7:
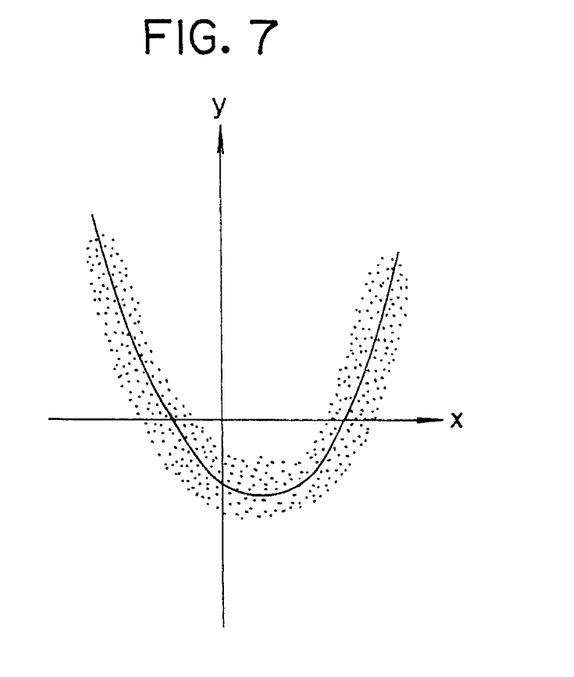
FIG. 7 is a graph showing a parabola as an example of an approximation curve to be used in the pattern recognition system of FIG. 1.

Here, as an example, a case in which it is assumed that the approximation curve can be expressed by a parabola as shown in FIG. 7 will be described. In this case, denoting each one of the total K points in the distribution by its coordinates as $(x_i, y_i)$, $i=0, 1,—,K-1$, a distance $Y_i$ from each point to the approximation curve in the y-direction can be expressed by the following equation (1).

$$Y_i = y_i - (ax_i^2 + bx_i + c) \tag{1}$$

Then, the coefficients a, b, and c in this equation (1) is determined such that a sum P of the square of the distance from each point to the approximation curve given by the following equation (2) is minimized.

$$P = \sum_{i=0}^{k-1} Y_i^2 \tag{2}$$

Alternatively, the coefficients a, b, and c in the equation (1) can be determined by solving the following matrix equation (3).

$$\begin{pmatrix} \Sigma x_i^4 & \Sigma x_i^3 & \Sigma x_i^2 \\ \Sigma x_i^3 & \Sigma x_i^2 & \Sigma x_i \\ \Sigma x_i^2 & \Sigma x_i & K \end{pmatrix} \begin{pmatrix} a \\ b \\ c \end{pmatrix} = \begin{pmatrix} -\Sigma x_i^2 y_i \\ -\Sigma x_i y_i \\ -\Sigma y_i \end{pmatrix} \tag{3}$$

It is to be noted that the parabola can be determined in any known manner other than those described above as examples, and any quadratic curve other than the parabola used above, such as a circle or a circular arc, may be employed instead in a similar manner.

Once the approximation curve for approximating the original distribution is determined in such a manner, a transformation for mapping this approximation curve onto a straight line can be determined as the appropriate nonlinear transformation. In this manner, the nonlinear transformation and dictionary set up unit 13 determines the appropriate nonlinear transformation to be used by the nonlinear transformation unit 5, for each one of the categories to be registered in the system.

Then, after such a nonlinear transformation is applied to the feature vector for the input pattern by the nonlinear transformation unit 5, the matching of the transformed feature data with the reference feature models stored in the dictionary unit 9 is carried out at the matching unit 7 by calculating the multiple similarity as follows.

Namely, denoting the transformed feature data by $\{X_i\}$ where $i=0, —, N-1$ (N is a dimensionality of the feature vector) and expressing the reference feature model for the n-th category by L vectors $\{F(n)_{i,j}\}$ and L eigenvalues $\lambda(n)_j$ where $j=0, —, L-1$ and L is an integer, the multiple similarity can be defined by the following equation (4).

$$S(n) = \sum_{j=0}^{L-1} \left( \lambda(n)_j / \lambda(n)_0 \sum_{i=0}^{N-1} X_i \cdot F(n)_{ij} \right) \tag{4}$$

Alternatively, in a case of using the subspace method, the similarity can be defined by the following equation (5).

$$S(n) = \sum_{j=0}^{L-1} \left( \sum_{i=0}^{N-1} X_i \cdot F(n)_{ij} \right) \tag{5}$$

Then, when the largest similarity value obtained is S(k) with respect to the reference feature model for the k-th category, this k-th category or the character code corresponding to this k-th category can be regarded as the recognition result.

Figure 8:
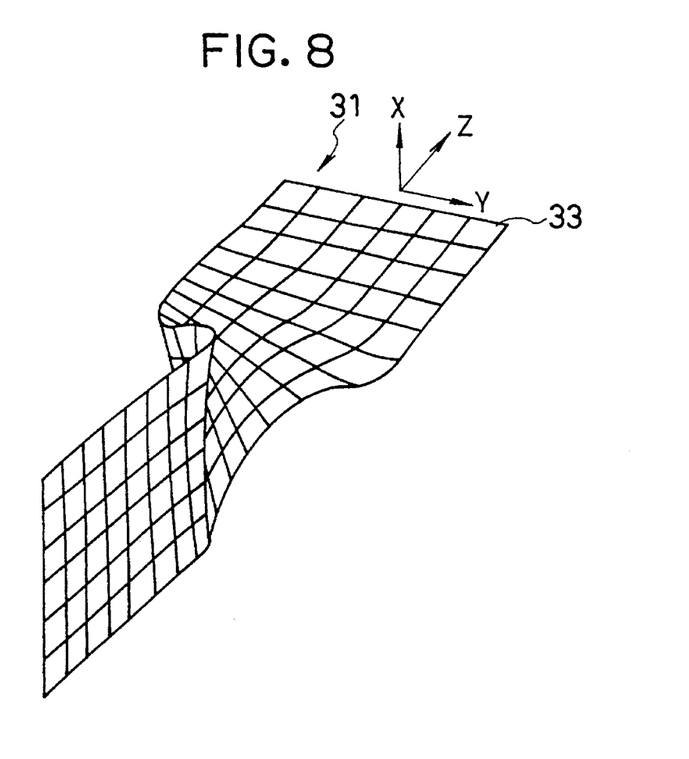
FIG. 8 is an illustration of an exemplary twisted surface for representing a feature vector distribution that can be handled by one variation of the pattern recognition according to the present invention.
Figure 9:
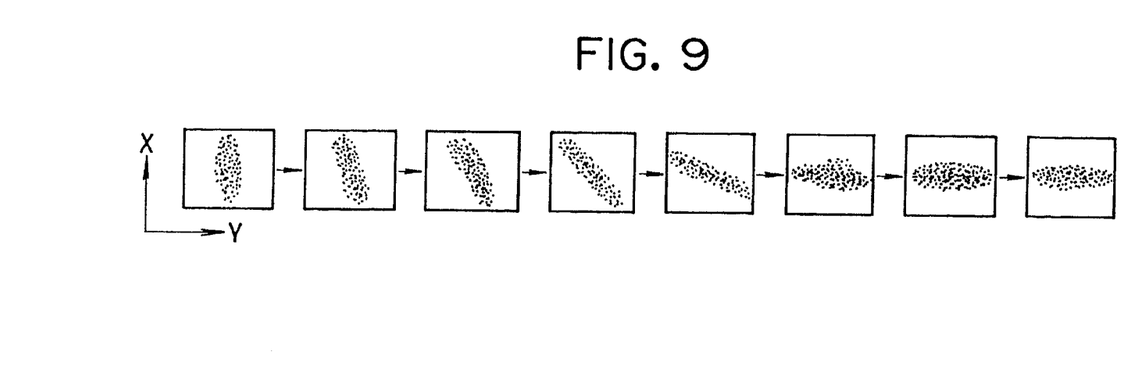
FIG. 9 is sequential illustrations of the cross sections of the feature vector distribution represented by the curved surface of FIG. 8 along the Z-axis.

Referring now to FIG. 8 and FIG. 9, one variation of the pattern recognition according to the present invention will be described by using another concrete example.

FIG. 8 shows a twisted surface 31 approximating a certain feature vector distribution, which is apparently non-Gaussian. In this case of FIG. 8, the cross sections of this distribution along the Z-axis sequentially appear as illustrated in FIG. 9.

In such a case, the twisted surface 31 is sub-divided into a number of small regions 33, and a nonlinear transformation for mapping each point on this twisted surface 31 onto a point in a flat surface is carried out in units of these small regions 33. Here, each small region 33 can be regarded as a part of a plane containing it, so that the mapping from each small region 33 to a flat surface can be expressed by a linear transformation.

In this case, for each point on the twisted surface 31, the closest one of the small regions 33 is searched, and then the transformation for mapping the closest small region 33 onto the flat surface is applied to each point. The closest small region 33 can be found by measuring the distance from each point to each one of the small regions 33, and the distance to each small region can be measured as a distance to a central point of each small region, for example. It is also possible to search the closest small region hierarchically, by hierarchically grouping the nearby small regions, and determining the closest group sequentially in each hierarchical level in hierarchical order, so as to reduce a processing time required for the search of the closest small region.

Figure 10A:
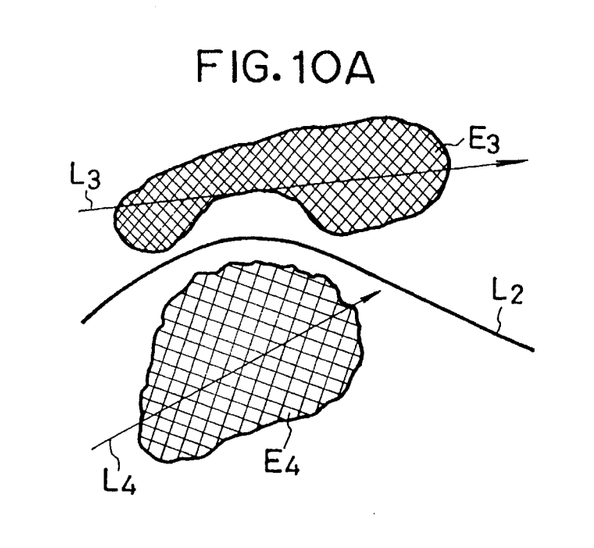
FIGS. 10A and 10B are diagrammatic illustrations of an exemplary feature vector distribution containing two separate blocks for the same category that can be handled by another variation of the pattern recognition according to the present invention.
Figure 10B:
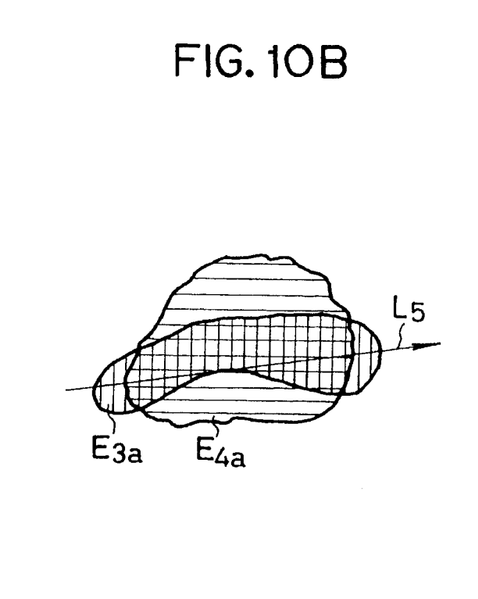

Referring now to FIGS. 10A and 10B, another variation of the pattern recognition according to the present invention will be described by using still another concrete example.

FIG. 10A shows a case in which two separate distribution blocks $E_3$ and $E_4$ for the same category are distributed. In such a case, these two distribution blocks $E_3$ and $E_4$ can be separated by a curve $L_2$, and each of these separated distribution blocks $E_3$ and $E_4$ can be separately transformed by different nonlinear transformation into Gaussian-like transformed distribution blocks $E_{3a}$ and $E_{4b}$, and then these separately transformed distribution blocks $E_{3a}$ and $E_{4b}$ can be superposed with each other by coinciding the position of the origins and aligning their principal axes $L_3$ and $L_4$ along a principal axis $L_5$ of the superposed distribution, as shown in FIG. 10B. In this manner, it becomes easier to clearly distinguish the category represented by these two separate distribution blocks from any other feature vectors of the other categories that might be present in a vicinity of these two separate distribution blocks. Here, it is also possible to superpose these two separate distribution blocks $E_3$ and $E_4$ first, before the application of the nonlinear transformation.

It is also to be noted here that, instead of this manner of handling separate distribution blocks for the same category, it is also possible to provide separate reference feature models for these separate distribution blocks such that there is more than one dictionary entry for one category, and treat those entries totally independently in the manner similar to the embodiment described above.

In the pattern recognition according to the present invention, it is also possible to use more than one nonlinear transformation in combination for each feature vector distribution. Namely, after a first nonlinear transformation is applied to the original non-Gaussian feature vector distribution, a further nonlinear portion in the transformed distribution may be identified and a second nonlinear transformation for removing this further nonlinear portion may be applied to the transformed distribution, and so on, until the final totally linear distribution is obtained. In this case, the reference feature models registered in the dictionary unit 9 are given in terms of the final totally linear distributions.

Alternatively, a plurality of nonlinear transformations may be applied simultaneously in parallel, to obtain the desired linear distribution. When there is no overlap among the portions that are affected by these plurality of nonlinear transformations, this parallel application of a plurality of nonlinear transformations results in the same end result as the serial application of a plurality of nonlinear transformations described above.

Now, at a time of setting up the reference feature models in the dictionary unit 9 by the preliminary learning operation, it is useful for the nonlinear transformation and dictionary set up unit 13 to provide the following information presentation functions.

First, after the principal component analysis of the distribution is carried out, it is useful to provide a function to present a projection of the distribution onto a plane defined by the principal components, or a cross section of the distribution at the plane defined by the principal components, such that an operator can visually inspect whether the distribution is sufficiently Gaussian-like or not. It is also useful to present a sequential cross sectional views of the distribution along a certain axis or line, as in FIG. 9 described above. In this case, the axis or line along which the cross sections are to be presented may be determined automatically by the system according to the principal component analysis, or specified by an operator by using a pointing device on a display screen.

It is also useful to display a point corresponding to a currently learning input pattern or an erroneously entered input pattern on the displayed distribution by changing its brightness or color from the other points in the displayed distribution. It is also useful to display the distribution for different categories together in different brightnesses or colors.

It is also useful to display the input pattern images or the feature vector images or data related to them for a plurality of the points in the displayed distribution, in corresponding positional relationship as in the displayed distribution. For example, for the A×B lattice points on the two-dimensional distribution displayed, the corresponding input pattern images can be displayed in a form of an A×B two-dimensional array.

It is also useful to allow the operator to specify a point on the displayed distribution, and outputting the input pattern image or the feature vector image or the data related to them or the corresponding synthesized speech in a case of using the speech data for the point specified by the operator. In this case, the operator can make various judgements about the factors affecting the preliminary learning operation, such as those concerning whether or not to learn this input pattern, which input patterns should be learned, which learning scheme to be employed, what kind of straight line or curve or hypersurface to be used, etc., according to the outputted data.

The display of the distribution can be made in any desirable manner, such as that in which each input pattern is represented by a point, that in which the frequency of appearances of each pattern is indicated by the gradation level or color, that in which wire frames are superposed, or that in which an N-dimensional representation is adopted.

By employing these information presentation functions in the nonlinear transformation and dictionary set up unit 13, it becomes possible to support the effective and efficient dictionary preparation and modification operations, which can also contribute to the improvement of the recognition rate in the pattern recognition system.

It is to be noted here that, besides those already mentioned above, many modifications and variations of the above embodiments may be made without departing from the novel and advantageous features of the present invention. Accordingly, all such modifications and variations are intended to be included within the scope of the appended claims. claims.

What is claimed is:

1. A pattern recognition system for identifying an input pattern with one of a plurality of prescribed recognizable categories for patterns, comprising:

pattern input means for inputting the input pattern to be recognized;

feature extraction means for extracting a feature vector from the input pattern inputted by the pattern input means;

nonlinear transformation means for applying a nonlinear transformation for each of said prescribed recognizable categories to the feature vector extracted by the feature extraction means to obtain a transformed feature data for the input pattern for each of said prescribed recognizable categories, where the nonlinear transformation for each of said prescribed recognizable categories maps linearly inseparable distributions in a vector space containing the feature vector onto separable distributions; and matching means for comparing the transformed feature data for the input pattern for each of said prescribed recognizable categories with a corresponding reference feature model for each of said prescribed recognizable categories indicating a feature vector distribution for each of said prescribed recognizable categories, for finding a category of the input pattern as that of the reference feature model for one of said prescribed recognizable categories that is closest to the transformed feature data for the input pattern for said one of said prescribed recognizable categories.

2. The system of claim 1, wherein the nonlinear transformation maps a nonlinear subset representing a distribution in the vector space onto a linear space.

3. The system of claim 2, further comprising means for determining the nonlinear transformation for each of said prescribed recognizable categories applied by the nonlinear transformation means, by approximating the feature vector distribution for each of said prescribed recognizable categories obtained by using learning patterns of said each of said prescribed recognizable categories by a nonlinear subset of the feature vector distribution, and choosing a transformation which maps the nonlinear subset onto a linear space as the nonlinear transformation for each of said prescribed recognizable categories.

4. The system of claim 1, further comprising dictionary means for registering the reference feature model for each of said prescribed recognizable categories in advance.

5. The system of claim 4, further comprising means for determining the reference feature model for each of said prescribed recognizable categories registered into the dictionary means as data indicating a distribution obtained by applying the nonlinear transformation for each of said prescribed recognizable categories to the feature vector distribution for each of said prescribed recognizable categories obtained by using learning patterns of said each of said prescribed recognizable categories.

6. The system of claim 1, wherein the matching means compares the transformed feature data for the input pattern with the reference feature model for each of said prescribed recognizable categories, by calculating a similarity of the transformed feature data for the input pattern and the reference feature model for each of said prescribed recognizable categories, such that the reference feature model closest to the transformed feature data for the input pattern is found as that for which the calculated similarity is maximum among all the reference feature model for all of said prescribed recognizable categories.

7. The system of claim 1, wherein the nonlinear transformation subdivides the feature vector distribution into a number of small regions, and maps each of the subdivided small regions separately onto a linear space.

8. The system of claim 1, wherein when the feature vector distribution for a certain one of said prescribed recognizable categories contains a plurality of spatially separated distribution blocks in the vector space, the nonlinear transformation superposes said plurality of spatially separated distribution blocks with each other in the vector space.

9. The system of claim 1, further comprising presentation means for presenting information related to the feature vector distribution for each of said prescribed recognizable categories obtained by using learning patterns of said each of said prescribed recognizable categories for an inspection by an operator.

10. The system of claim 9, wherein the presentation means presents the information in at least one of:

(1) a mode for displaying a projection of the feature vector distribution onto a subspace of the vector space;

(2) a mode for displaying a cross section of the feature vector distribution;

(3) a mode for displaying a plurality of cross sections of the feature vector distribution in an ordered sequence;

(4) a mode for displaying the feature vector distributions for more than one of said prescribed recognizable categories together, with different brightnesses or colors assigned for different ones of said prescribed recognizable categories;

(5) a mode for displaying at least one of the input pattern and the feature vector corresponding to a plurality of points in the feature vector distribution, in identical positional relationships as said plurality of points have in the feature vector distribution; and (6) a mode for presenting at least one of the input pattern and the feature vector for a point in the feature vector distribution specified by an operator.

11. The system of claim 1, wherein the feature extraction means comprises a K×K Gaussian Function Filter, K is an integer, and wherein a K×K-dimensional feature vector is extracted as a result thereof.

12. A method of pattern recognition for identifying an input pattern with one of a plurality of prescribed recognizable categories for patterns, comprising the steps of:

(a) inputting the input pattern to be recognized;

(b) extracting a feature vector from the input pattern inputted at the step (a);

(c) applying a nonlinear transformation for each of said prescribed recognizable categories to the feature vector extracted at the step (b) to obtain a transformed feature data for the input pattern for each of said prescribed recognizable categories, where the nonlinear transformation for each of said prescribed recognizable categories maps linearly inseparable distributions in a vector space containing the feature vector onto linearly separable distributions; and (d) comparing the transformed feature data for the input pattern for each said prescribed recognizable categories with a corresponding reference feature model for each of said prescribed recognizable categories indicating a feature vector distribution for each of said prescribed recognizable categories, for finding a category of the input pattern as that of the reference feature model for one of said prescribed recognizable categories that is closest to the transformed feature data for the input pattern for said one of said prescribed recognizable categories.

13. The method of claim 12, wherein the nonlinear transformation maps a nonlinear subset representing a distribution in the vector space onto a linear space.

14. The method of claim 13, further comprising the step of determining the nonlinear transformation for each of said prescribed recognizable categories applied at the step (c), by approximating the feature vector distribution for each of said prescribed recognizable categories obtained by using learning patterns of said each of said prescribed recognizable categories by a nonlinear subset of the feature vector distribution, and choosing a transformation which maps the nonlinear subset onto a linear space as the nonlinear transformation for each of said prescribed recognizable categories.

15. The method of claim 12, further comprising the step of registering the reference feature model for each of said prescribed recognizable categories in a form of a dictionary in advance.

16. The method of claim 15, further comprising the step of determining the reference feature model for each of said prescribed recognizable categories registered into the dictionary as data indicating a distribution obtained by applying the nonlinear transformation for each of said prescribed recognizable categories to the feature vector distribution for each of said prescribed recognizable categories obtained by using learning patterns of said each of said prescribed recognizable categories.

17. The method of claim 12, wherein the step (d) compares the transformed feature data for the input pattern with the reference feature model for each of said prescribed recognizable categories, by calculating a similarity of the transformed feature data for the input pattern and the reference feature model for each of said prescribed recognizable categories, such that the reference feature model closest to the transformed feature data for the input pattern is found as that for which the calculated similarity is maximum among all the reference feature models for all of said prescribed recognizable categories.

18. The method of claim 12, wherein the nonlinear transformation subdivides the feature vector distribution into a number of small regions, and maps each of the subdivided small regions separately onto a linear space.

19. The method of claim 12, wherein when the feature vector distribution for a certain one of said prescribed recognizable categories contains a plurality of spatially separated distribution blocks in the vector space, the nonlinear transformation superposes said plurality of spatially separated distribution blocks with each other in the vector space.

20. The method of claim 12, further comprising the step of presenting information related to the feature vector distribution for each of said prescribed recognizable categories obtained by using learning patterns of said each of said prescribed recognizable categories for an inspection by an operator.

21. The method of claim 20, wherein the presenting step presents the information in at least one of:

(1) a mode for displaying a projection of the feature vector distribution onto a subspace of the vector space:

(2) a mode for displaying a cross section of the feature vector distribution:

(3) a mode for displaying a plurality of cross sections of the feature vector distribution in an ordered sequence;

(4) a mode for displaying the feature vector distributions for more than one of said prescribed recognizable categories together, with different brightnesses or colors assigned for different ones of said prescribed recognizable categories;

(5) a mode for displaying at least one of the input pattern and the feature vector corresponding to a plurality of points in the feature vector distribution, in identical positional relationship as said plurality of points have in the feature vector distribution; and (6) a mode for presenting at least one of the input pattern and the feature vector for a point in the feature vector distribution specified by an operator.

22. The method of claim 12, wherein the feature vector is extracted in the step (b) by using a KxK Gaussian Function Filter, K is an integer, and wherein a KxK-dimensional feature vector is extracted as a result thereof.

* * * * *